US012149060B2

(12) United States Patent
Onodera et al.

(10) Patent No.: US 12,149,060 B2
(45) Date of Patent: Nov. 19, 2024

(54) PROTECTOR AND WIRE HARNESS

(71) Applicant: SUMITOMO WIRING SYSTEMS, LTD., Mie (JP)

(72) Inventors: Kota Onodera, Mie (JP); Kohei Osono, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 174 days.

(21) Appl. No.: 17/784,252

(22) PCT Filed: Nov. 24, 2020

(86) PCT No.: PCT/JP2020/043628
§ 371 (c)(1),
(2) Date: Jun. 10, 2022

(87) PCT Pub. No.: WO2021/117475
PCT Pub. Date: Jun. 17, 2021

(65) Prior Publication Data
US 2023/0063380 A1 Mar. 2, 2023

(30) Foreign Application Priority Data

Dec. 12, 2019 (JP) ................. 2019-224362

(51) Int. Cl.
*H02G 3/04* (2006.01)
*B60R 16/02* (2006.01)
(52) U.S. Cl.
CPC ....... *H02G 3/0406* (2013.01); *B60R 16/0215* (2013.01)

(58) Field of Classification Search
CPC ......... H02G 3/04; H02G 3/32; B60R 16/0215
See application file for complete search history.

(56) References Cited

U.S. PATENT DOCUMENTS 3,229,026 A * 1/1966 Sulzer ................. H02G 3/0616
174/664
3,622,942 A * 11/1971 Rynk ................. H01R 13/5804
439/471

(Continued)

FOREIGN PATENT DOCUMENTS

JP H11-150828 A 6/1999
JP 2009-065798 A 3/2009

(Continued)

OTHER PUBLICATIONS

International Search Report issued on Feb. 16, 2021 for WO 2021/117475 A1 (4 pages).

*Primary Examiner* — Paresh Paghadal
(74) *Attorney, Agent, or Firm* — Venjuris, P.C.

(57) ABSTRACT

One aspect of the present disclosure provides a protector configured to suppress interference of an electric wire lead out from the protector with another component. A protector according to one aspect of the present disclosure includes an accommodating portion for accommodating an electric wire, and an intermediate lead-out portion for leading the electric wire accommodated in the accommodating portion to outside of the accommodating portion. The intermediate lead-out portion includes a wire fixing portion for fixing the electric wire, and a regulating wall portion for regulating a route of the electric wire at a different position from that of the wire fixing portion.

13 Claims, 6 Drawing Sheets

(56) References Cited

U.S. PATENT DOCUMENTS

| | | | | |
|---|---|---|---|---|
| 3,889,909 A | * | 6/1975 | Koscik | H02G 3/22 |
| | | | | 439/471 |
| 2001/0003404 A1 | * | 6/2001 | Shikata | B60R 16/0215 |
| | | | | 307/10.1 |

FOREIGN PATENT DOCUMENTS

| | | | |
|---|---|---|---|
| JP | 2010-213376 A | | 9/2010 |
| JP | 2016054588 A | * | 4/2016 |

* cited by examiner

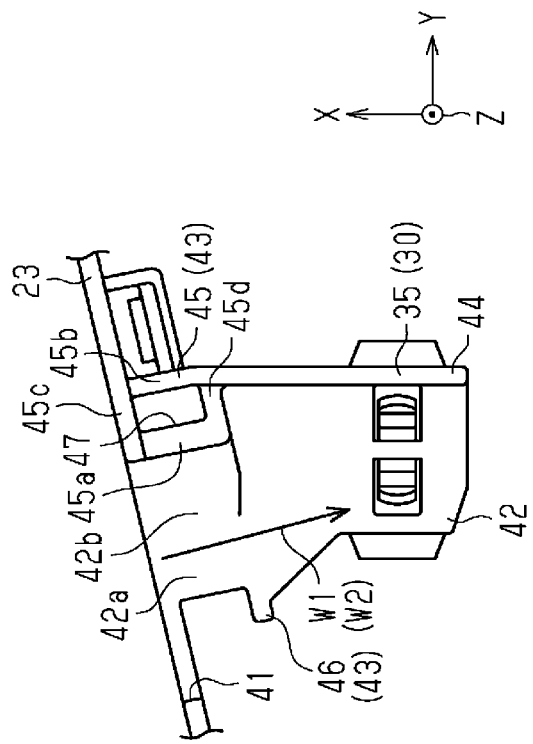

PROTECTOR AND WIRE HARNESS

CROSS REFERENCE TO RELATED APPLICATIONS

This application is a national phase of PCT application No. PCT/JP2020/043628, filed on 24 Nov. 2020, which claims priority from Japanese patent application No. 2019-224362, filed on 12 Dec. 2019, all of which are incorporated herein by reference.

TECHNICAL FIELD

The present disclosure relates to a protector and a wire harness.

BACKGROUND

There are techniques in which electric wires routed in vehicles such as automobiles are accommodated in protectors so that the electric wires are protected and the routes of the electric wires are regulated (see Patent Document 1, for example). Such protectors include a lead-out portion for leading out an electric wire to the outside of an accommodating portion in order to connect the electric wire to an external electrical device that is a connection target. The lead-out portion includes a wire fixing portion for fixing an electric wire thereto, as a result of a banding portion such as tape or a cable tie being positioned or fixed, for example.

PRIOR ART DOCUMENT

Patent Document

Patent Document 1: JP 2009-065798 A

SUMMARY OF THE INVENTION

Problems to be Solved

Incidentally, with a protector such as those described above, movement of an electric wire can be regulated to a certain degree using a wire fixing portion but variability arises due to the degree of tightening or the like by cable ties or the like, and there is a risk that the electric wire will interfere with other components nearby.

An object of the present disclosure is to provide a protector configured to suppress interference of an electric wire lead out from a protector with another component, and a wire harness that includes the protector.

Means to Solve the Problem

A protector according to the present disclosure includes: an accommodating portion for accommodating an electric wire, and a lead-out portion for leading the electric wire accommodated in the accommodating portion to outside of the accommodating portion, and the lead-out portion includes a wire fixing portion for fixing the electric wire and a regulating wall portion for regulating a route of the electric wire at a different position from that of the wire fixing portion.

A wire harness according to the present disclosure includes an electric wire and a protector that accommodates the electric wire, and the protector includes an accommodating portion for accommodating the electric wire, and a lead-out portion for leading the electric wire accommodated in the accommodating portion to outside of the accommodating portion, and the lead-out portion includes an wire fixing portion for fixing the electric wire, and a regulating wall portion for regulating a route of the electric wire at a different position from that of the wire fixing portion.

Effect of the Invention

With a protector and a wire harness according to the present disclosure, it is possible to suppress interference of an electric wire lead out from the protector with another component.

BRIEF DESCRIPTION OF THE DRAWINGS

FIG. 6 is a partial enlarged view of a protector according to the embodiment.

DETAILED DESCRIPTION TO EXECUTE THE INVENTION

Description of Embodiments of Present Disclosure

Figure 1:
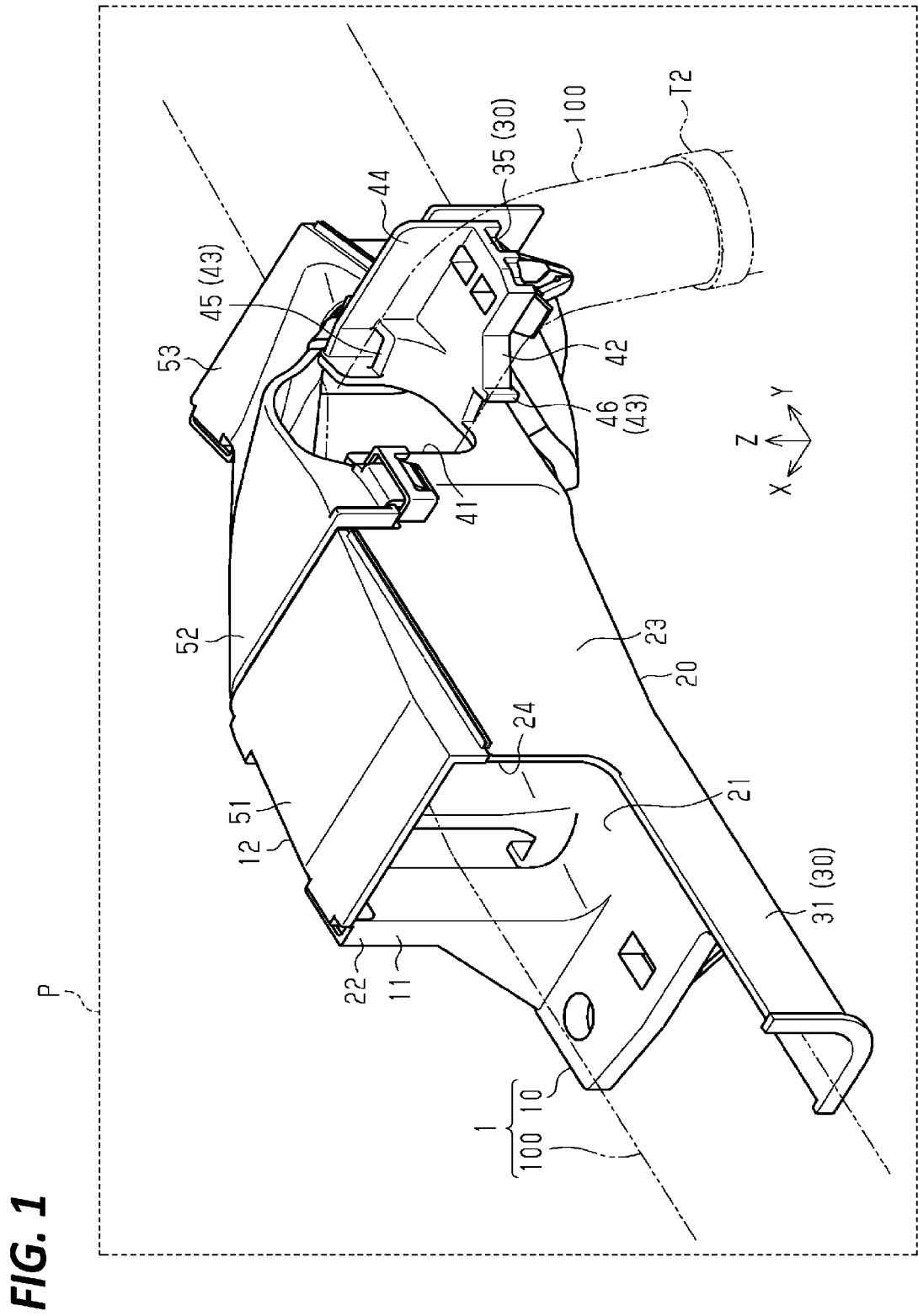
FIG. 1 is a perspective view of a wire harness that is accommodated in an instrument panel according to one embodiment of the present disclosure.

First, embodiments of the present disclosure will be listed and described.

[1] A protector according to the present disclosure includes an accommodating portion for accommodating an electric wire, and a lead-out portion for leading the electric wire accommodated in the accommodating portion to the outside of the accommodating portion, and the lead-out portion includes a wire fixing portion for fixing the electric wire, and a regulating wall portion for regulating a route of the electric wire at a different position from that of the wire fixing portion.

With this configuration, it is possible to regulate the route of the electric wire lead out from the lead-out portion by providing the regulating wall portion for regulating the route of the electric wire at a different position from that of the wire fixing portion. Accordingly, it is possible to suppress interference between the electric wire and another component.

[2] Preferably, the lead-out portion includes a lead-out port communicating the inside of the accommodating portion with the outside, and the regulating wall portion extends in a direction that intersects a communicating direction of the lead-out port.

With this configuration, the regulating wall portion extends in a direction that intersects the communicating direction of the lead-out port, and thus, for example, when an electric wire is lead out from the lead-out port along the communicating direction of the lead-out port to the outside of the accommodating portion, the direction of the electric wire can be regulated using the regulating wall portion extending in a direction that intersects the communicating direction.

[3] Preferably, the regulating wall portion is provided at a position further from the accommodating portion than the wire fixing portion is.

With this configuration, the regulating wall portion is provided at a position further from the accommodating portion than the wire fixing portion is, and thereby the route of the electric wire can be regulated at a position further from the accommodating portion than a region fixed by the wire fixing portion is. Accordingly, it is possible to suppress interference between the electric wire and another component.

[4] Preferably, the regulating wall portion and the wire fixing portion of the lead-out portion constitute a molded article integrally molded with the accommodating portion.

With this configuration, the regulating wall portion and the wire fixing portion of the lead-out portion are integrally molded with the accommodating portion, and thus it is possible to suppress an increase in the number of components.

[5] Preferably, a wire harness according to the present disclosure includes an electric wire and a protector for accommodating the electric wire, the protector includes an accommodating portion for accommodating the electric wire and a lead-out portion for leading the electric wire accommodated in the accommodating portion to the outside of the accommodating portion, and the lead-out portion includes a wire fixing portion for fixing the electric wire and a regulating wall portion for regulating a route of the electric wire at a different position from that of the wire fixing portion.

With this configuration, the regulating wall portion for regulating the route of the electric wire is provided at a different position from that of the wire fixing portion, and thus it is possible to regulate the route of the electric wire lead out from the lead-out portion. Accordingly, it is possible to suppress interference between the electric wire and another component.

[6] Preferably, when the wire fixing portion is given as a first wire fixing portion, a second wire fixing portion for fixing the electric wire lead out from the lead-out portion at a position distant from the protector is further provided, and the regulating wall portion is provided between the first wire fixing portion and the second wire fixing portion.

With this configuration, the regulating wall portion is positioned between the first wire fixing portion that constitutes the protector and the second wire fixing portion that is at a position distant from the protector, and thus it is possible to suppress interference between the electric wire and another component in the region between the first wire fixing portion and the second wire fixing portion.

[7] Preferably, the protector is adjacent to another vehicle component.

With this configuration, as a result of the protector being adjacent to another vehicle component, the electric wire lead out from the lead-out portion of the protector is likely to interfere with the other vehicle component, but it is possible to suppress interference between the other vehicle component and the electric wire by providing the regulating wall portion as described above.

[8] Preferably, the regulating wall portion is provided between the electric wire and the other vehicle component.

With this configuration, the regulating wall portion is provided between the electric wire and another vehicle component, and thus it is possible to suppress interference of the electric wire with the other vehicle component with the regulating wall portion.

[9] Preferably, the other vehicle component is a duct of an air conditioner.

With this configuration, by suppressing interference between a duct of an air conditioner, which is the other vehicle component, and the electric wire, it is possible to suppress displacement of the duct caused by interference of the electric wire with the duct. The duct has a surface that faces a blowing port of the air conditioner, and thus by suppressing displacement of the duct, it is possible to suppress displacement of the duct with respect to the blowing port.

[10] Preferably, the protector and the electric wire are provided in an instrument panel.

With this configuration, in the wire harness that includes the protector and the electric wire that are provided within the instrument panel, it is possible to suppress interference of the electric wire with another component. The instrument panel is a location in which meters, a duct of an air conditioner, and the like are likely to be concentrated, and, in the wire harness that is disposed in such a location, suppressing interference between the electric wire and another component is advantageous in terms of suppressing damage to the electric wire and influence on the other component.

[11] Preferably, the regulating wall portion extends in a direction that intersects a lead-out direction of the electric wire through the lead-out port of the lead-out portion.

With this configuration, the regulating wall portion extends in a direction that intersects the lead-out direction of the electric wire in the lead-out port of the lead-out portion, and thereby the lead-out direction of the electric wire can be changed on the regulating wall portion. Accordingly, it is possible to suppress interference between the electric wire lead to the outside of the accommodating portion and another component.

Detailed Embodiments of Present Disclosure

The following describes specific examples of the protector and the wire harness according to the present disclosure with reference to the drawings. In the drawings, some of the components may be shown exaggerated or simplified for the sake of convenience of description. In addition, the dimensional ratios of the components may be different in each of the drawings. Being "parallel" or "orthogonal" as used herein includes not only being strictly parallel or orthogonal, but also being generally parallel or orthogonal, as long as the actions and effects of the present embodiment can be achieved. It should be noted that the present invention is not limited to these examples, but is indicated by the claims, and all changes that come within the meaning and range of equivalency of the claims are intended to be embraced therein.

As shown in FIG. 1, a wire harness 1 includes a protector 10 and an electric wire 100. The protector 10 and the electric wire 100 of the wire harness 1 are mounted in a vehicle.

(Configuration of Protector 10)

As shown in FIG. 1, the protector 10 according to this embodiment includes a main portion 11 and a cover portion 12. The main portion 11 and the cover portion 12 are both molded resin articles. In addition, the main portion 11 and the cover portion 12 are integrally molded articles. The protector 10 according to the present embodiment is mounted in an instrument panel P of a vehicle.

Figure 5:
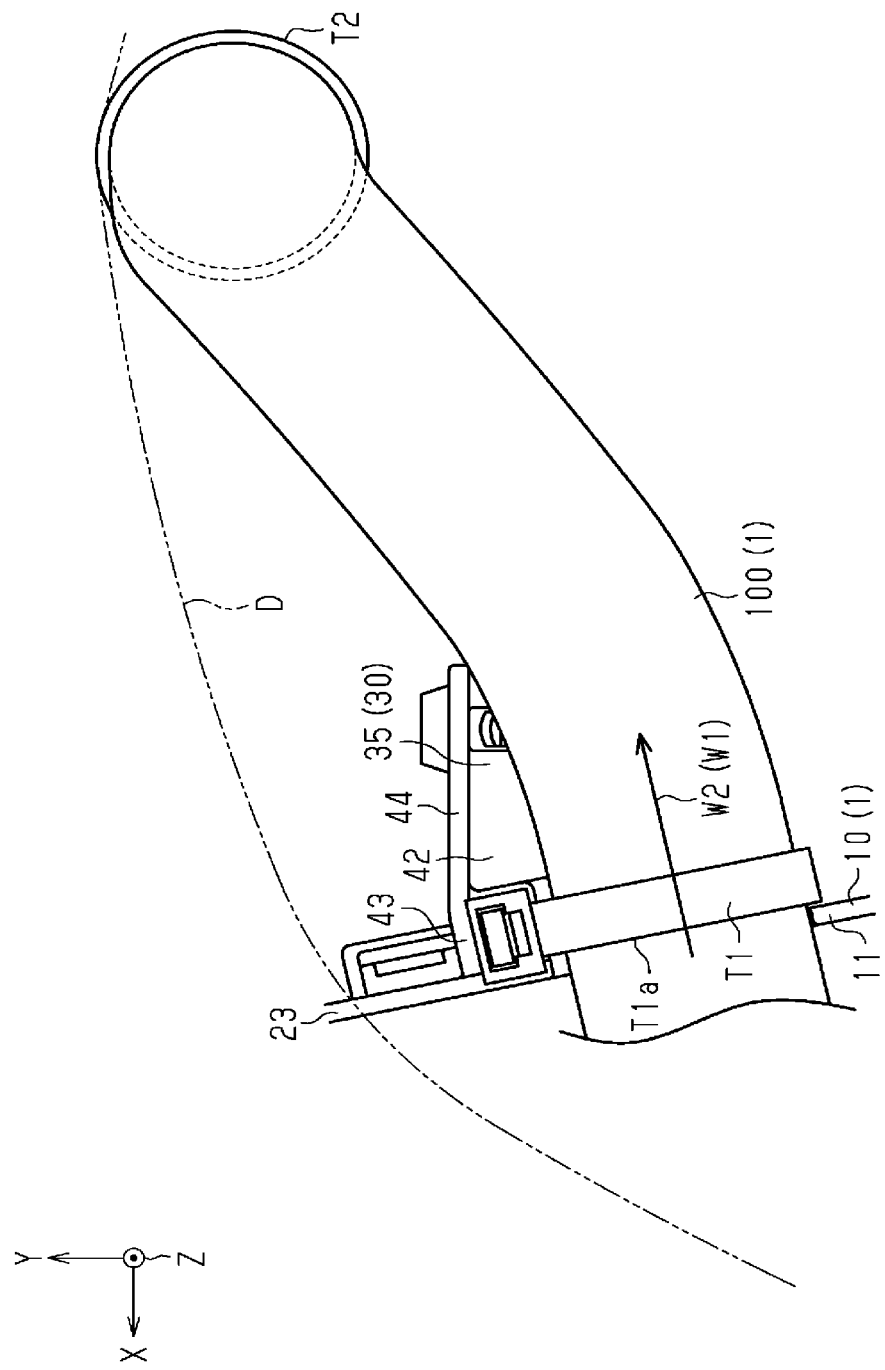
FIG. 5 is a partial enlarged view of a wire harness according to the embodiment.

As shown in FIG. 5, the protector 10 is attached near a duct D that is a blowing route of an air conditioner, and is adjacent to the duct D. A configuration is adopted, for example, in which the duct D of the air conditioner is disposed near the protector 10. The duct D in this embodiment corresponds to another vehicle component.

In the description below, the width direction of the main portion 11 is referred to as a width direction X, and the length direction of the main portion 11 is referred to as a length direction Y. Furthermore, a direction that is orthogonal to both of the width direction X and the length direction Y is referred to as a height direction Z. Note that the height direction Z is a direction that is parallel to the vertical direction in a state in which the protector 10 is attached to a vehicle, and the direction indicated by the arrow Z in FIG. 1 is indicated as the upward direction.

(Configuration of Main Portion 11)

As shown in FIGS. 1 to 4, the main portion 11 includes an accommodating portion 20 and a plurality of lead-out portions 30. The accommodating portion 20 is a portion for accommodating the electric wire 100. The lead-out portions 30 are portions for leading the electric wire 100 out of the accommodating portion 20.

(Configuration of Accommodating Portion 20)

Figure 4:
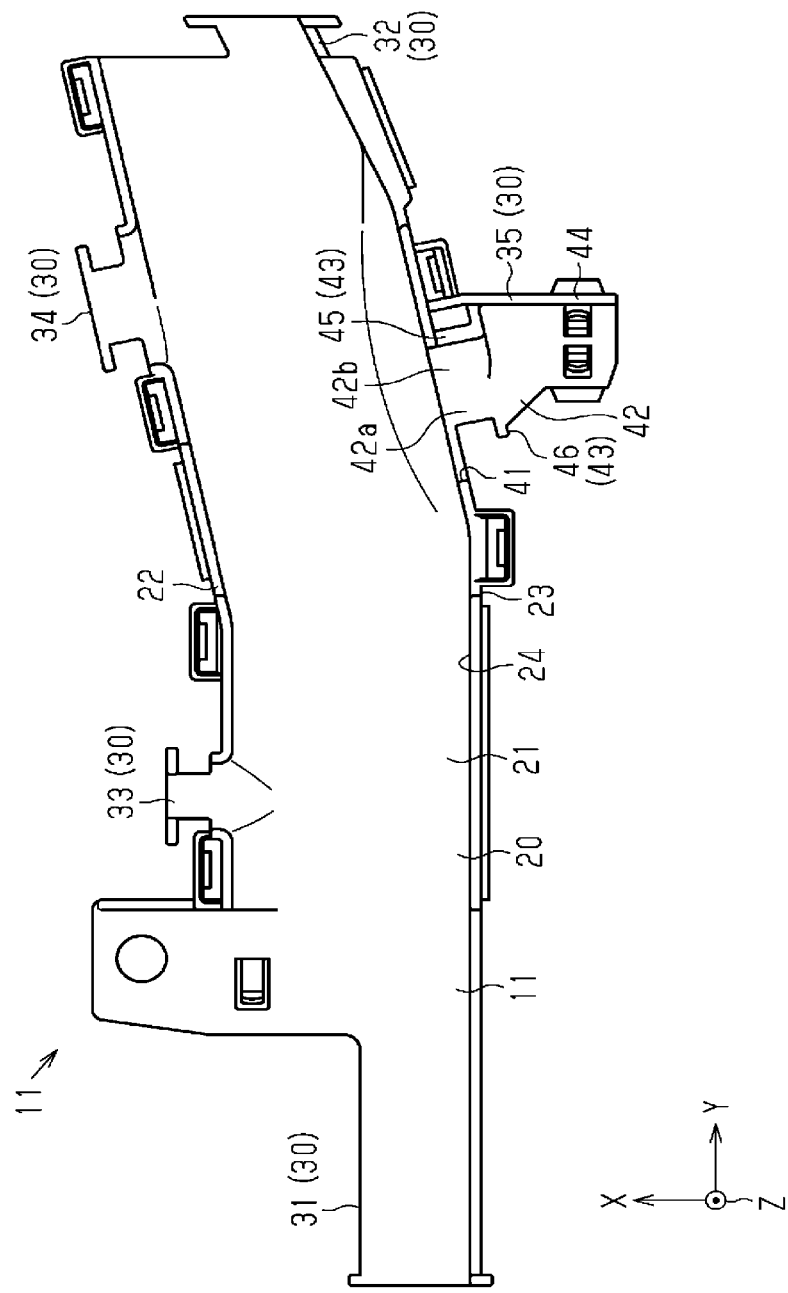
FIG. 4 is a top view of the accommodating portion that constitutes a protector according to the embodiment.

As shown in FIGS. 1 and 4, the accommodating portion 20 includes a bottom wall portion 21, a pair of side wall portions 22 and 23 extending from the bottom wall portion 21, and an opening portion 24 that is open in a direction opposing the bottom wall portion 21. The accommodating portion 20 is formed in a semi-tubular shape defined by the bottom wall portion 21 and the pair of side wall portions 22 and 23.

As shown in FIGS. 1 and 4, the pair of side wall portions 22 and 23 include a side wall portion 22 provided along a side edge portion on one side in the width direction X of the bottom wall portion 21 and a side wall portion 23 provided along a side edge portion on the other side in the width direction X of the bottom wall portion 21. The pair of side wall portions 22 and 23 are formed so as to extend upward in the height direction Z from the bottom wall portion 21.

(Configuration of Lead-Out Portions 30)

Figure 2:
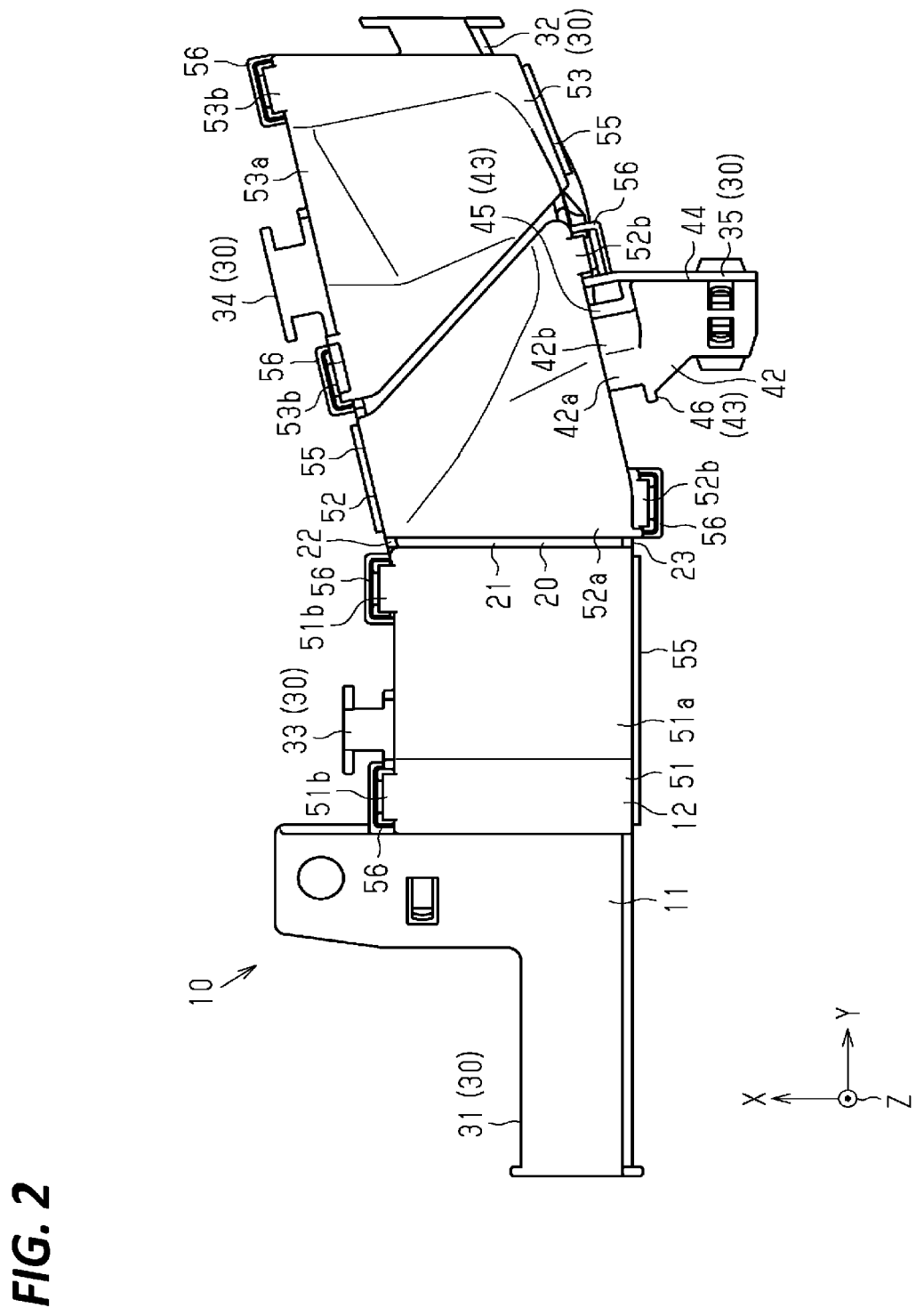
FIG. 2 is a top view of a protector according to the embodiment.

As shown in FIGS. 2 and 4, the lead-out portions 30 include an end lead-out portion 31 provided in an end portion on one side in the length direction Y which is a direction in which the accommodating portion 20 extends, and an end lead-out portion 32 provided in an end portion on the other side in the length direction Y in which the accommodating portion 20 extends. Furthermore, the lead-out portions 30 includes two intermediate lead-out portions 33 and 34 provided on the side wall portion 22 of the accommodating portion 20 and an intermediate lead-out portion 35 provided on the side wall portion 23 of the accommodating portion 20.

The electric wire 100 is drawn out from the accommodating portion 20 using the lead-out portions 31 to 35. The electric wire 100 drawn out from the lead-out portions 31 to 35 is fixed by a banding member T1 such as tape or a cable tie.

(Configuration of Intermediate Lead-Out Portion 35)

Figure 3:
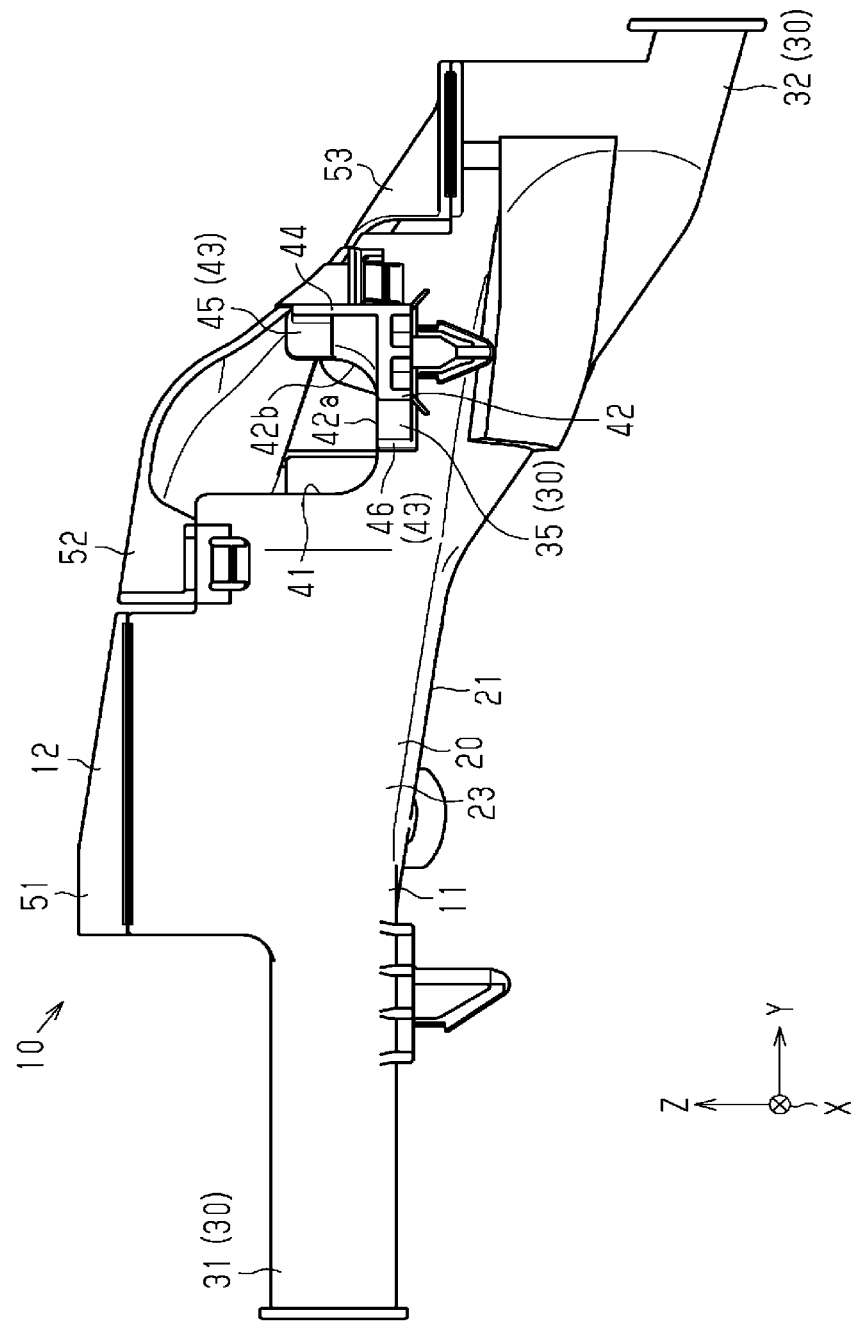
FIG. 3 is a side view of a protector according to the embodiment.

As shown in FIGS. 1, 3, and 4, the intermediate lead-out portion 35 includes a lead-out port 41, an extending wall portion 42, a wire fixing portion 43, and a regulating wall portion 44.

The lead-out port 41 may be a through hole that passes through the side wall portion 23 of the accommodating portion 20, and is formed such that the electric wire 100 is communicated between the inside and the outside of the accommodating portion 20. The lead-out port 41 has a shape that is open upward in the side wall portion 23.

The extending wall portion 42 is configured to have a plate-like shape extending from the outer surface of the side wall portion 23 where the extending wall portion 42 is positioned, in a direction orthogonal to the outer surface. The extending wall portion 42 is positioned below the lead-out port 41 in a state where the protector 10 is mounted in the vehicle.

The extending wall portion 42 includes a flat seating surface 42a and a curved seating surface 42b on the base end side in the extending direction thereof. The flat seating surface 42a and the curved seating surface 42b are aligned in the width direction. The flat seating surface 42a and the curved seating surface 42b are positioned below the lead-out port 41, in a state where the protector 10 is mounted in the vehicle. The flat seating surface 42a faces in the height direction Z. The flat seating surface 42a of the extending wall portion 42 is, for example, a placement surface on which the electric wire 100 lead out from the accommodating portion 20 via the lead-out port 41 is placed. The flat seating surface 42a is, for example, a supporting surface for supporting the electric wire 100 from below. The curved seating surface 42b is a curved surface having a circular arc shape, and comes into contact with the outer peripheral surface of the electric wire 100 drawn from the lead-out port 41 to the outside of the accommodating portion 20. Accordingly, the electric wire 100 drawn out from the lead-out port 41 to the outside of the accommodating portion 20 is guided by the curved seating surface 42b.

The wire fixing portion 43 is a portion for attaching the banding member T1 (see FIG. 5) for banding the electric wire 100 to the extending wall portion 42, outside the lead-out port 41. The wire fixing portion 43 includes, for example, a cylindrical frame portion 45 that is provided on one side in the width direction of the extending wall portion, and a protruding portion 46 extending outward in the width direction from the other side in the width direction of the extending wall portion 42. The wire fixing portion 43 according to this embodiment is set on the base end side of the extending wall portion 42.

As shown in FIG. 6, the frame portion 45 is configured to be formed in a substantially square-tubular shape by including a first side wall portion 45a adjacent to the curved seating surface 42b in the width direction of the extending wall portion 42, a second side wall portion 45b that opposes the first side wall portion 45a in the width direction of the extending wall portion 42 at a predetermined distance, and two side wall portions 45c and 45d that connect two end portions of the first side wall portion 45a and two end portions of the second side wall portion 45b. The frame portion 45 includes the insertion hole 47 defined by the first side wall portion 45a, the second side wall portion 45b, and two side wall portions 45c and 45d, and the banding member T1 can be inserted into the center of the insertion hole 47, for example. Note that the side wall portion 45c out of the two side wall portions 45c and 45d also serves as the side wall portion 23 of the accommodating portion 20.

The insertion hole 47 of the frame portion 45 passes through the frame portion 45 in the height direction Z. A band portion T1a of the banding member T1 (see FIG. 5) can be inserted into the insertion hole 47.

The protruding portion 46 is provided at a position spaced from the side wall portion 23 of the accommodating portion 20 in the extending direction of the extending wall portion 42 at a predetermined distance. At this time, the side wall portion 23 of the accommodating portion 20 and the protruding portion 46 are distant from each other in the extending direction of the extending wall portion 42 by a slightly longer distance than the width of the band portion T1a. The protruding portion 46 is configured to regulate movement of the band portion T1a and suppress displacement of the banding member T1.

(Configuration of Regulating Wall Portion 44)

As shown in FIGS. 1, 2, 4, 5, and 6, the regulating wall portion 44 is provided on the leading end side of the extending wall portion 42 relative to the wire fixing portion 43, in the intermediate lead-out portion 35. The regulating wall portion 44 is provided at a position further from the accommodating portion 20 than the wire fixing portion 43, for example. The regulating wall portion 44 and the wire fixing portion 43 are molded integrally with the accommodating portion 20. The regulating wall portion 44 according to this embodiment is configured to have a flat-plate shape.

The regulating wall portion 44 is adjacent to the extending wall portion 42 in the width direction of the extending wall portion 42.

As shown in FIG. 6, the regulating wall portion 44 extends from an edge portion of the second side wall portion 45b of the frame portion 45. At this time, the extending direction of the regulating wall portion 44 extends in a direction that intersects the extending direction of the second side wall portion 45b. The extending direction of the second side wall portion 45b coincides with a communicating direction W1 of the lead-out port 41. The regulating wall portion 44 extends in a direction that intersects the communicating direction W1 of the lead-out port 41, for example.

As shown in FIG. 5, the regulating wall portion 44 extends in a direction that intersects a lead-out direction W2 of the electric wire 100, in the lead-out port 41 of the intermediate lead-out portion 35. In this example, the lead-out direction W2 and the communicating direction W1 match.

As shown in FIG. 5, the electric wire 100 lead out of the accommodating portion 20 from the intermediate lead-out portion 35 is configured to be fixed to the vehicle via a banding member T2, at a position distant from the protector 10. The banding member T2 can adopt, for example, a band clip, and the banding member T2 functions as a second wire fixing portion as a result of a clip portion being engaged with an engage hole provided in the vehicle. At this time, the regulating wall portion 44 is provided between the wire fixing portion 43 and the banding member T2. The regulating wall portion 44 is provided between the electric wire 100 that is lead out from the intermediate lead-out portion 35 and the duct D. The regulating wall portion 44 regulates the route of the electric wire 100 lead out from the intermediate lead-out portion 35, at a different position from that of the wire fixing portion 43, for example.

(Configuration of Cover Portion 12)

As shown in FIGS. 1 to 3, the cover portion 12 includes a plurality of cover bodies 51, 52, and 53. The number of cover bodies 51, 52, and 53 of the cover portion 12 can be changed in accordance with the size of the main portion 11, the number of branches of the electric wire 100, branch positions, and the like.

In this embodiment, the cover portion 12 includes the three cover bodies 51, 52, and 53, for example. The cover bodies 51, 52, and 53 are aligned from one side to the other side in the length direction Y, in the order of the cover body 51, the cover body 52, the cover body 53. The cover body 51 is provided at a position corresponding to the end lead-out portion 31 and the intermediate lead-out portion 33. The cover body 52 is provided at a position corresponding to the intermediate lead-out portion 35. The cover body 53 is provided at a position corresponding to the end lead-out portion 32 and the intermediate lead-out portion 34 of the main portion 11.

As shown in FIG. 2, the cover bodies 51, 52, and 53 of the cover portion 12 are connected to the side wall portions 22 and 23 of the accommodating portion 20 via the hinge portions 55. More specifically, the cover bodies 51 and 53 are connected to the side wall portion 22 of the accommodating portion 20 via the hinge portions 55. The cover body 52 is connected to the side wall portion 23 of the accommodating portion 20 via the hinge portion 55. Each of the cover bodies 51, 52, and 53 is configured to be rotatable using the hinge portion 55 as a rotation center. Accordingly, the opening portion 24 of the accommodating portion 20 can be opened and closed using the cover bodies 51, 52, and 53 of the cover portion 12.

The cover body 51 includes a cover main portion 51a and a plurality of lock claw portions 51b provided in a side edge portion in the width direction X of the cover main portion 51a. In addition, the cover body 52 includes a cover main portion 52a and a plurality of lock claw portions 52b provided in a side edge portion in the width direction X of the cover main portion 52a, and the cover body 53 includes a cover main portion 53a and a plurality of lock claw portions 53b provided in a side edge portion in the width direction X of the cover main portion 53a.

The cover main portion 51a, 52a, and 53a are configured to have a flat-plate-like shape.

Two lock claw portions 51b, two lock claw portions 52b, and two lock claw portions 53b are respectively provided on the cover main portions 51a, 52a, and 53a. The lock claw portions 51b of the cover body 51 and the lock claw portions 53b of the cover body 53 are provided on the side edge portions on one side in the width direction X of the cover main portion 51a and 53a. The lock claw portions 52b of the cover body 52 are provided in the side edge portion on the other side in the width direction X of the cover main portion 52a. The lock claw portions 52b are provided on the opposite side to the other lock claw portions 51b and 53b in the width direction X, for example. The lock claw portions 51b, 52b, and 53b are each provided on the side opposite to the hinge portions 55 for rotatably supporting the cover bodies 51, 52, and 53, respectively.

The lock claw portions 51b, 52b, and 53b are engaged with lock frame portions 56 provided in the side wall portions 22 and 23 of the accommodating portion 20 by being inserted into the lock frame portions 56, and can hold the cover bodies 51, 52, and 53 in a closed state.

Hereinafter, the actions of this embodiment will be described.

The protector 10 of the wire harness 1 according to this embodiment is configured such that the electric wire 100 is accommodated in the accommodating portion 20. The electric wire 100 is lead out from the lead-out portions 31 to 35 of the protector 10 according to this embodiment. At this time, the electric wire 100 lead from the lead-out port 41 of the intermediate lead-out portion 35 to the outside of the accommodating portion 20 is fixed by the wire fixing portion 43 of the intermediate lead-out portion 35. Movement of the electric wire 100 toward the duct D is regulated due to the regulating wall portion 44 of the intermediate lead-out portion 35.

Hereinafter, the effects of this embodiment will be described.

(1) The protector 10 can regulate the route of the electric wire 100 lead out from the intermediate lead-out portion 35 due to the regulating wall portion 44 for regulating the route of the electric wire 100, at a different position from that of the wire fixing portion 43. Accordingly, it is possible to suppress interference between the electric wire 100 and another component.

(2) The regulating wall portion 44 extends in a direction that intersects the communicating direction W1 of the lead-out port 41, and thus, for example, when the electric wire 100 is lead from the lead-out port 41 to the outside of the accommodating portion 20 along the communicating direction W1 of the lead-out port 41, the direction of the electric wire 100 can be regulated using the regulating wall portion 44 extending in a direction that intersects the communicating direction W1.

(3) The regulating wall portion 44 is provided at a position further from the accommodating portion 20 than the wire fixing portion 43 is, making it possible to regulate the route of the electric wire 100 at a position further from the accommodating portion 20 than a location fixed by the wire fixing portion 43. Accordingly, it is possible to suppress interference between the electric wire 100 and another component.

(4) The regulating wall portion 44 and the wire fixing portion 43 of the intermediate lead-out portion 35 constituted an article integrally molded with the accommodating portion 20, and thus, it is possible to suppress an increase in the number of components.

(5) The regulating wall portion 44 is positioned between the wire fixing portion 43 that constitutes the protector 10 and the banding member T2 that is a second wire fixing portion positioned at a position distant from the protector 10, and thus it is possible to suppress interference between another component and the electric wire 100 in the region between the wire fixing portion 43 and the banding member T2.

(6) If the protector 10 is disposed adjacent to another vehicle component, the electric wire 100 lead out from the intermediate lead-out portion 35 of the protector 10 is likely to interfere with the other vehicle component, but it is possible to suppress interference between the other vehicle component and the electric wire 100 by providing the regulating wall portion 44 as described above.

(7) It is possible to suppress interference of the electric wire 100 with another vehicle component using the regulating wall portion 44, by providing the regulating wall portion 44 between the electric wire 100 and the other vehicle component.

(8) It is possible to suppress displacement of the duct D of an air conditioner, which is another vehicle component, caused by interference of the electric wire 100 with the duct D, by suppressing interference between the duct D and the electric wire 100. The duct D has a surface that faces a blowing port of the air conditioner, and thus it is possible to suppress displacement of the duct D with respect to the blowing port by suppressing displacement of the duct D.

(9) In the wire harness 1 that includes the protector 10 and the electric wire 100 that are provided within the instrument panel P, it is possible to suppress interference of the electric wire 100 with another component. The instrument panel P is a location in which meters, the duct D of the air conditioner, and the like are likely to be concentrated, and, in the wire harness 1 that is disposed in such a location, suppressing interference between the electric wire 100 and the other component is meaningful in terms of suppressing damage to the electric wire 100 and influence on another component.

(10) The regulating wall portion 44 extends in a direction that intersects the lead-out direction W2 of the electric wire 100, in the lead-out port 41 of the intermediate lead-out portion 35, and thereby the lead-out direction W2 of the electric wire 100 can be changed by the regulating wall portion 44. Accordingly, it is possible to suppress interference between the electric wire 100 lead out of the accommodating portion 20 and another component.

Other Embodiments

Note that the above-described embodiment may be modified and implemented as described below. The embodiment described above and the following modification examples can be combined and implemented within a scope that that is technically consistent.

Although not particularly mentioned in the above-described embodiment, the regulating wall portion 44 and the electric wire 100 do not need to be constantly in contact with each other. A configuration may also be adopted in which the regulating wall portion 44 and the electric wire 100 are in contact with each other only when the vehicle in which the wire harness 1 has been mounted is stopped or only when the vehicle is travelling, for example.

In the above embodiment, the regulating wall portion 44 and the wire fixing portion 43 of the intermediate lead-out portion 35 constitute a molded article integrally molded with the accommodating portion 20, but may also be separate articles.

In the above embodiment, the intermediate lead-out portion 35 includes the wire fixing portion 43 on the base end side of the intermediate lead-out portion 35, and the regulating wall portion 44 on the leading end side of the intermediate lead-out portion 35, but there is no limitation thereto. A configuration may also be adopted in which the wire fixing portion 43 is disposed on the leading end side of the intermediate lead-out portion 35, and the regulating wall portion 44 is disposed on the base end side of the intermediate lead-out portion 35.

In addition, the regulating wall portion 44 is provided between the wire fixing portion 43 and the banding member T2, but the arrangement relation may be changed as appropriate.

In the above embodiment, a configuration is adopted in which the wire fixing portion 43 and the regulating wall portion 44 are provided in one lead-out portion 35 from among the plurality of lead-out portions 31 to 35, but there is no limitation thereto. A configuration may also be adopted in which the wire fixing portion 43 and the regulating wall portion 44 are provided in the other lead-out portions 31 to 34, similarly to the intermediate lead-out portion 35.

In the above embodiment, the cover portion 12 is constituted by the three cover bodies 51, 52, and 53, but there is no limitation thereto. The cover portion may be constituted by two cover bodies or four or more cover bodies. In addition, instead of the cover portion 12 being constituted by a plurality of cover bodies, the cover portion 12 may be constituted by a single cover body.

In the above embodiment, the main portion 11 and the cover portion 12 constitute a molded article integrally molded with each other, but the main portion 11 and the cover portion 12 may be separate molded articles.

In the above embodiment, a configuration is adopted in which the cover portion 12 is provided, but there is no limitation thereto, and a configuration may also be adopted in which the cover portion 12 is omitted.

In the above embodiment, a configuration is adopted in which the protector 10 is adjacent to the duct D of an air conditioner, which is a vehicle component, but there is no limitation thereto. A configuration may also be adopted in which the protector 10 and a vehicle component other than the duct D are adjacent.

In the above embodiment, a configuration is adopted in which the protector 10 and the electric wire 100 are provided in the instrument panel P, but a configuration may also be adopted in which the protector 10 and the electric wire 100 are provided in another location of the vehicle, for example.

The accommodating portion 20 according to an embodiment of the present disclosure may be referred to as a long accommodating groove configured to accommodate a portion having a predetermined-length of the entire length of the electric wire 100.

In the embodiment of the present disclosure, the end lead-out portion 31 that is one of the plurality of lead-out portions 30 and the opening portion 24 may be called a "first wire gate" or a "main gate" configured such that a plurality of electric wires included in the wire harness 1 pass therethrough. Of the plurality of lead-out portions 30, the lead-out portions 32 to 35 excluding the end lead-out portion 31 may each be referred to as a "branch line gate" configured such that some of a plurality of electric wires included in the wire harness 1 pass therethrough. The intermediate lead-out portion 35 that is one selected from the plurality of lead-out portions 30 and the lead-out port 41 may be referred to as a "second wire gate" or "predetermined branch line gate" configured such that at least one predetermined electric wire that includes a curved portion passes therethrough, the at least one predetermined electric wire possibly being some or all of a plurality of electric wires included in the wire harness 1.

As shown in FIGS. 5 and 6, the flat seating surface 42a and the curved seating surface 42b of the extending wall portion 42 can be configured to come into contact with the outer peripheral surface of the electric wire 100 at least at a first length position of the electric wire 100 and support the electric wire 100, and may be referred to as a "flat seating surface" and a "curved seating surface", respectively. The regulating wall portion 44 can be configured to not come into contact with the outer peripheral surface of the electric wire 100 at the first length position, but come into contact with the outer peripheral surface of the electric wire 100 at a second length position, and lead out the electric wire 100 in the regulate lead-out direction W2. The plate surface of the regulating wall portion 44 may be non-parallel to the regulated lead-out direction W2 of the electric wire 100. As shown in planar view of FIG. 5, for example, when the electric wire 100 is fixed to the wire fixing portion 43 of the intermediate lead-out portion 35 using the banding member T1, the curved seating surface 42b of the extending wall portion 42 (see FIG. 2) comes into contact with the outer peripheral surface of the electric wire 100 at the first length position that is in the vicinity of the lead-out port 41, and the leading edge of the regulating wall portion 44 comes into contact with the outer peripheral surface of the electric wire 100 at the second length position distant from the lead-out port 41 by a predetermined distance in the regulated lead-out direction W2 of the electric wire 100. At this time, except for the leading edge of the regulating wall portion 44, the regulating wall portion 44 may have no contact with the outer peripheral surface of the electric wire 100. As shown in FIGS. 5 and 6, in planar view of the protector 10, the plate surface of the regulating wall portion 44 excluding the leading edge of the regulating wall portion 44 may be positioned away from the outer peripheral surface of the electric wire 100 with a space therebetween.

The present disclosure includes the following aspects. The reference numerals for some components of the exemplary embodiment are added in order to facilitate understanding, not to limit the present disclosure. Some of the items described in the following aspects may be omitted, and some of the items described in the aspects may be selected or extracted and combined.

[Supplementary Note 1] One aspect of the present disclosure is directed to a wire harness protector (10) configured to regulate routing paths of a plurality of electric wires (100) of a wire harness (1), and the wire harness protector (10) can include:
  a first wire gate (31, 24) configured such that the plurality of electric wires (100) pass therethrough, and
  a second wire gate (35, 41) configured such that at least one predetermined electric wire that includes a curved portion passes therethrough, the at least one predetermined electric wire being some or all of the plurality of electric wires (100),
  the second electric wire gate (35, 41) can include:
    a hole (41) that permits the at least one predetermined electric wire to path therethrough,
    a seating surface (42b) configured to come into contact with an outer peripheral surface of the at least one predetermined electric wire at a first length position of the at least one predetermined electric wire and support the at least one predetermined electric wire, and
    a regulating wall portion (44) configured to not come into contact with the outer peripheral surface of the at least one predetermined electric wire at the first length position, to come into contact with the outer peripheral surface of the at least one predetermined electric wire at a second length position that is different from the first length position, and to lead out the at least one predetermined electric wire in a regulated lead-out direction (W2), and
  the regulating wall portion (44) can include a leading edge that comes into contact with the outer peripheral surface of the at least one predetermined electric wire at the first length position.

[Supplementary Note 2] In one aspect of the present disclosure, the regulating wall portion (44) excluding the leading edge may be located away from the outer peripheral surface of the at least one predetermined electric wire with a space therebetween.

[Supplementary Note 3] In one aspect of the present disclosure, in planar view of the protector (100), the regulating wall portion (44) may be non-parallel to the regulated lead-out direction (W2) of the at least one predetermined electric wire.

| List of Reference Numerals | |
|---|---|
| 1 | Wire harness |
| 10 | Protector |
| 11 | Main portion |

-continued

List of Reference Numerals

| | |
|---|---|
| 12 | Cover portion |
| 20 | Accommodating portion |
| 21 | Bottom wall portion |
| 22, 23 | Side wall portion |
| 24 | Opening portion |
| 30 | Lead-out portion |
| 31, 32 | End lead-out portion |
| 33, 34, 35 | Intermediate lead-out portion |
| 41 | Lead-out port |
| 42 | Extending wall portion |
| 42a | Flat surface portion |
| 42b | Curved surface portion |
| 43 | Wire fixing portion (first wire fixing portion) |
| 44 | Regulating wall portion |
| 45 | Frame portion |
| 45a | First side wall portion |
| 45b | Second side wall portion |
| 45c, 45d | Side wall portion |
| 46 | Protruding portion |
| 47 | Insertion hole |
| 51, 52, 53 | Cover body |
| 51a | Cover main portion |
| 51b | Lock claw portion |
| 52a | Cover main portion |
| 52b | Lock claw portion |
| 53a | Cover main portion |
| 53b | Lock claw portion |
| 55 | Hinge portion |
| 56 | Lock frame portion |
| 100 | Electric wire |
| D | Duct (other vehicle component) |
| P | Instrument panel |
| T1 | Banding member |
| T1a | Band portion |
| T2 | Banding member (second wire fixing portion) |
| W1 | Communicating direction |
| W2 | Lead-out direction |
| X | Width direction |
| Y | Length direction |
| Z | Height direction |

What is claimed is:

1. A protector comprising:
an accommodating portion accommodating an electric wire of a wire harness; and
a lead-out portion leading the electric wire accommodated in the accommodating portion to the outside of the accommodating portion,
wherein the lead-out portion includes a lead-out port communicating the inside of the accommodating portion with the outside of the accommodating portion, a wire fixing portion fixing the electric wire, and a regulating wall portion regulating a route of the electric wire at a different position from that of the wire fixing portion,
the wire fixing portion includes a flat seating surface and a curved seating surface coming into contact with an outer peripheral surface of the electric wire at a first length position of the electric wire that is in the vicinity of the lead-out port, and supporting the first length position of the electric wire in cooperation with a banding member, and a frame portion in a cylindrical shape adjacent to the curved seating surface,
in planar view of the protector, a portion of the regulating wall portion adjacent to the lead-out port is positioned away from the outer peripheral surface of the electric wire with a space therebetween, and the leading edge of the regulating wall portion comes into contact with the outer peripheral surface of the electric wire at a second length position of the electric wire and leads out the electric wire in a regulated lead-out direction,
the regulating wall portion extends from the frame portion, and
the banding member is inserted into an insertion hole defined through the frame portion and bands the electric wire in the vicinity of the first length position of the electric wire.

2. The protector according to claim 1,
wherein the regulating wall portion extends in a direction that intersects a communicating direction of the lead-out port.

3. The protector according to claim 1,
wherein the regulating wall portion is provided at a position further from the accommodating portion than the wire fixing portion is.

4. The protector according to claim 1,
wherein the regulating wall portion and the wire fixing portion of the lead-out portion constitute a molded article integrally molded with the accommodating portion.

5. A wire harness comprising:
an electric wire and a protector accommodating the electric wire,
wherein the protector includes an accommodating portion accommodating the electric wire and a lead-out portion leading the electric wire accommodated in the accommodating portion to the outside of the accommodating portion,
the lead-out portion includes a lead-out port communicating the inside of the accommodating portion with the outside of the accommodating portion, a wire fixing portion fixing the electric wire, and a regulating wall portion regulating a route of the electric wire at a different position from that of the wire fixing portion,
the wire fixing portion includes a flat seating surface and a curved seating surface coming into contact with an outer peripheral surface of the electric wire at a first length position of the electric wire that is in the vicinity of the lead-out port, and supporting the first length position of the electric wire in cooperation with a banding member, and a frame portion in a cylindrical shape adjacent to the curved seating surface,
in planar view of the protector, a portion of the regulating wall portion adjacent to the lead-out port is positioned away from the outer peripheral surface of the electric wire with a space therebetween, and the leading edge of the regulating wall portion comes into contact with the outer peripheral surface of the electric wire at a second length position of the electric wire and leads out the electric wire in a regulated lead-out direction,
the regulating wall portion extends from the frame portion, and
the banding member is inserted into an insertion hole defined through the frame portion and bands the electric wire in the vicinity of the first length position of the electric wire.

6. The wire harness according to claim 5, further comprising:
when the wire fixing portion is given as a first wire fixing portion, a second wire fixing portion fixing the electric wire lead out from the lead-out portion at a position distant from the protector,
wherein the regulating wall portion is provided between the first wire fixing portion and the second wire fixing portion.

7. The wire harness according to claim 5,
wherein the protector is adjacent to another vehicle component.
8. The wire harness according to claim 7,
wherein the regulating wall portion is provided between the electric wire and the other vehicle component.
9. The wire harness according to claim 7,
wherein the other vehicle component is a duct of an air conditioner.
10. The wire harness according to claim 5,
wherein the protector and the electric wire are provided in an instrument panel.
11. The wire harness according to claim 5,
wherein the regulating wall portion extends in a direction that intersects a lead-out direction of the electric wire, in the lead-out port of the lead-out portion.
12. The protector according to claim 1,
wherein the insertion hole of the frame portion is defined by a first side wall portion adjacent to the curved seating surface in a width direction of the wire fixing portion, a second side wall portion opposing the first side wall portion in the width direction of the wire fixing portion, and two side wall portions connecting two end portions of the first side wall portion and two end portions of the second side wall portion, and
the regulating wall portion extends from the second side wall portion in a direction intersecting an extending direction of the second side wall portion.
13. The wire harness according to claim 5,
wherein the insertion hole of the frame portion is defined by a first side wall portion adjacent to the curved seating surface in a width direction of the wire fixing portion, a second side wall portion opposing the first side wall portion in the width direction of the wire fixing portion, and two side wall portions connecting two end portions of the first side wall portion and two end portions of the second side wall portion, and
the regulating wall portion extends from the second side wall portion in a direction intersecting an extending direction of the second side wall portion.

* * * * *